United States Patent [19]
Hoydic

[11] Patent Number: 4,520,633
[45] Date of Patent: Jun. 4, 1985

[54] SALAD BOWL

[76] Inventor: Roberta L. Hoydic, 5035 Highwood Dr., Flint, Mich. 48504

[21] Appl. No.: 602,262

[22] Filed: Apr. 23, 1984

Related U.S. Application Data

[63] Continuation-in-part of Ser. No. 405,512, Aug. 5, 1982, abandoned.

[51] Int. Cl.³ .............................................. F25D 3/08
[52] U.S. Cl. ........................................ 62/457; 62/371
[58] Field of Search ................. 62/371, 372, 457, 529, 62/530

[56] References Cited

U.S. PATENT DOCUMENTS

| | | | |
|---|---|---|---|
| 1,393,235 | 10/1921 | Mitrovich | 62/457 |
| 2,810,276 | 10/1957 | Murray | 62/457 |
| 3,130,288 | 4/1964 | Monaco et al. | 62/457 |
| 3,383,880 | 5/1968 | Peters | 62/457 |
| 3,605,433 | 9/1971 | Strathaus | 62/371 |
| 3,710,589 | 1/1973 | Brown et al. | 62/457 |
| 4,005,586 | 2/1977 | Lyons | 62/372 |
| 4,304,106 | 12/1981 | Donnelly | 62/457 |

Primary Examiner—Lloyd L. King
Attorney, Agent, or Firm—Gifford, VanOphem, Sheridan, Sprinkle & Nabozny

[57] ABSTRACT

A bowl for keeping displayed food chilled includes a flat lid within its interior secured to its sides, thereby defining an upper, food-containing receptacle and a lower, ice-containing chamber.

7 Claims, 4 Drawing Figures

SALAD BOWL

This application is a continuation-in-part of application Ser. No. 405,512, filed Aug. 5, 1982, now abandoned.

BACKGROUND OF THE INVENTION

I. Field of the Invention

The present invention is directed to a receptacle for holding food, and more particularly to a receptacle using ice to keep food chilled while the receptacle is in use.

II. Description of the Prior Art

Receptacles for holding food have long been known. Because of the perishable nature of some foods, ice or water has been employed in order to lower the temperature or maintain a lowered temperature of such foods while the receptacle was in use.

Some receptacles merely contained a layer of ice upon which the food was laid. Use of these receptacles had the undesirable result that food often became mixed with the ice, or with the water associated with ice upon melting and the food was thus less pleasing to eat. Also, food that intermixed with the ice or water was sometimes left uneaten, resulting in increased expense due to such waste.

Other food receptacles have nested one receptacle within another in order to keep the ice or water separated from the food. While these performed well functionally, the need for a second receptacle substantially increased the cost of providing a receptacle that kept food chilled, because of the cost of the second receptacle. The nested receptacle was often of more complex or expensive construction than that of the receiving receptacle.

SUMMARY OF THE PRESENT INVENTION

The present invention overcomes the above-mentioned problems by providing a receptacle for chilling food which is of simple and inexpensive construction, yet serves to keep the food therein from mixing with the ice or water used for chilling. A bowl of relatively flat shape is provided with a lid whose edge fits into a groove on the interior bowl to thereby define an upper food receiving chamber and a lower ice receiving chamber separated by the lid. The lid has flexible, liftable tabs which permit a firm grip so that the lid may be easily removed from the groove. The use of the liftable tabs advantageously permits full cleaning underneath the tabs after use, thereby preventing contamination of subsequently contained foods or transmission of disease.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF THE PREFERRED EMBODIMENT OF THE PRESENT INVENTION

Figure 1:
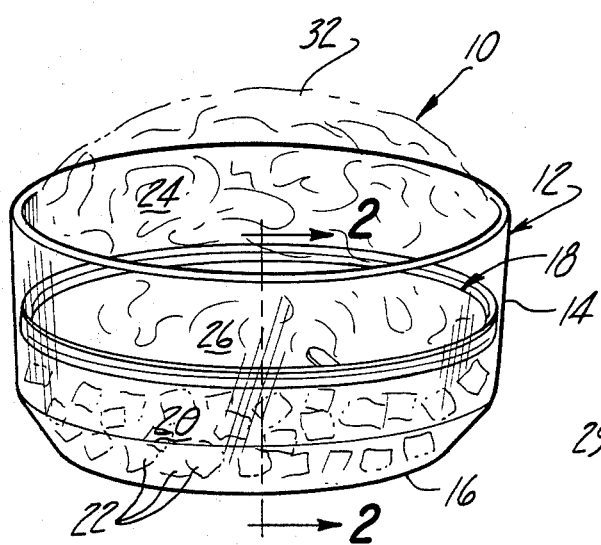
FIG. 1 is a perspective view of the preferred embodiment of the present invention.
Figure 2:
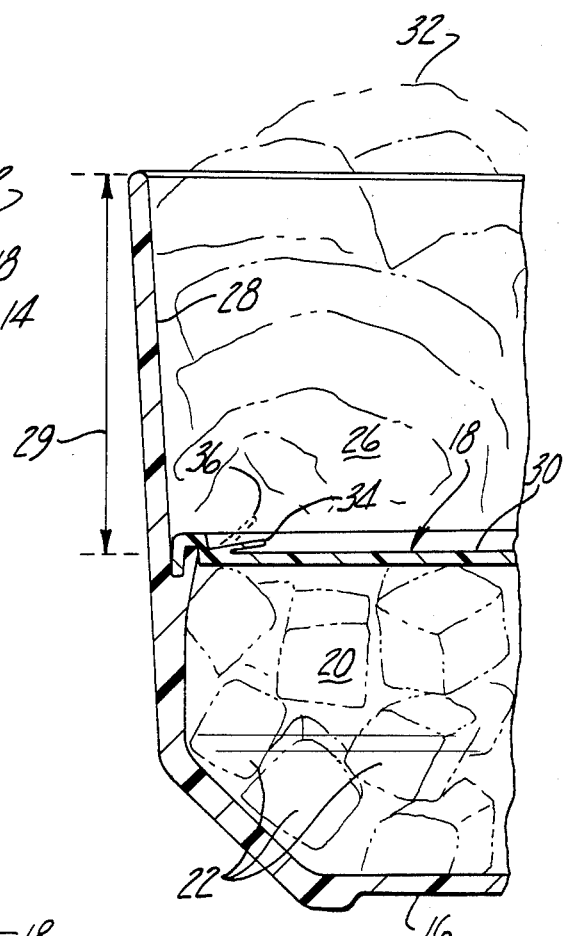
FIG. 2 is a cross-sectional view of the preferred embodiment of the present invention taken substantially along line 2—2 in FIG. 1.

With reference now to FIGS. 1 and 2, the receptacle 10 according to the present invention is thereshown and comprises a plastic bowl 12. The bowl 12 has a substantially cylindrical wall 14, a bottom 16, and a flexible and plastic lid 18 disposed within the bowl 12, the lid 18 being above but spaced from the bottom 16. The wall 14, the bottom 16, and the lid 18 define a chamber 20. This chamber 20 can be filled with pieces of ice 22.

The bowl 12 is thus separated into two parts, the ice receiving chamber 20 and a food receiving chamber 26, the latter being defined by an upper portion 28 of the wall 14 and an upper surface 30 of the lid 18 when the lid is in place. In order to close the chamber 20 and prevent intermixing of the contents of the ice receiving chamber 20 and the food receiving chamber 26, upper portion 28 of the wall 14 preferably flares outwardly and the plane in which lid 18 lies defines a depth 29 along the wall 14 at which the diameter of the lid 18 and the inner diameter of the bowl 12 are substantially the same.

The chamber 26 receives the food 32 (shown in phantom only) to be held by the receptacle 10. The lid 18 thus keeps the food 32 and ice 22 separate from one another yet conducts heat from the food 32 and to the ice 22, thereby cooling the food 32 or keeping previously chilled food 32 cool.

Figure 3:
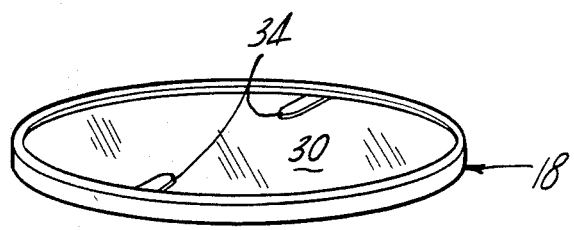
FIG. 3 is a perspective view of a portion of the preferred embodiment of the present invention.

With reference now to FIGS. 2 and 3, flat but flexible tabs 34 are thereshown secured to the upper surface 30 of the lid 18. The tabs 34 permit a user of the receptacle 10 to remove the lid 18 from the interior 24 of the bowl 12 by grasping one of tabs 34 and pulling upwardly on it to the position 36 shown in phantom in FIG. 2.

Figure 4:
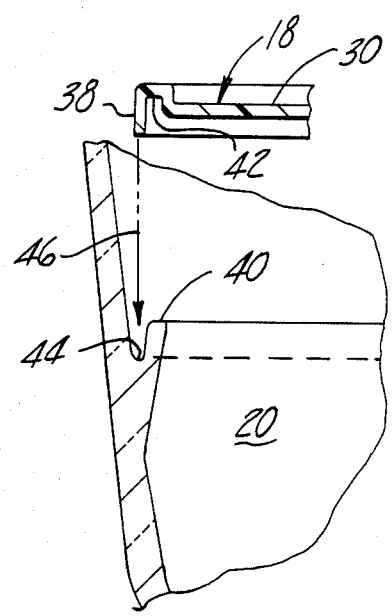
FIG. 4 is another cross-sectional view of the preferred embodiment of the present invention.

The means for retaining the lid 18 in the bowl 12 is shown in FIG. 4 and comprises a pair of lips 38 and 40 and a pair of grooves 42 and 44. Lip 38 and groove 42 are formed in the lid 18, and lip 40 and groove 44 are formed on the inside of wall 14 of the bowl 12. The cross-sectional shapes of lips 38 and 40 and grooves 42 and 44 are substantially rectangular, so that the lid 18 is detachably secured to bowl 12 by the mating of lip 38 and groove 44 and of lip 40 and groove 42. Arrow 46 shows the direction of mating.

The use of the receptacle 10 of the present invention is straightforward. If not already removed, the lid 18 is removed from the interior of the bowl 12 by pulling upon one or both of tabs 34, thereby disengaging lip 38 from groove 44 and lip 40 from groove 42. A desired amount of ice 22 is placed in the interior 24 of the bowl 12, but no so much ice 22 that the ice 22 extends above depth 29. Lid 18 is then inserted into the bowl 12 so that lip 38 meets with groove 44, and lip 40 meets with groove 42, thereby sealing the ice 22 within the chamber 20. Food 32, such as a salad, is then placed atop lid 18 in the chamber 26.

After the food 32 in the receptacle 10 has been consumed or removed, the lid 18 may be removed from the interior of the bowl 12 by pulling on one or both of the tabs 34, thereby disengaging the lips 38 and 40 from the grooves 42 and 44, respectively. Because the tabs 34 lie flat against the upper surface 30 of the lid 18, they do not waste space for food 32 within the chamber 26 nor do they interfere with the removal of food 32 therefrom during use. However, because the tabs 34 are flexible, they may be lifted to permit easy cleaning under them.

Having described my invention, however, many modifications thereto will become apparent to those skilled in the art to which it pertains without deviation from the spirit of the invention as defind by the scope of the claims. In particular, the bowl 12 and lid 18 can be made of any materials suitable for their intended use. Although the tabs 34 are thin and lie flat against the upper surface 30 of lid 18, any other means for pulling the lid 18 outwardly may be employed. Also, although a pair of lips 38 and 40 and grooves 42 and 44 are shown, any number, including a single lip or groove, could be used. Nor is it required that the cross-section of the lip or groove be substantially rectangular. Other means for attaching a lid to a receptacle are known in the art and may be employed. Finally, a cover (not shown) may be used that fits across the top of the bowl 12 for conventional sealing purposes, and may be attached to the bowl 12 by any known means. All of these modifications and others may be made without going beyond the spirit of the invention as defined by the scope of the appended claims.

I claim:

1. A receptacle comprising:
   a wall having an inner dimension;
   a substantially planar lid having an outer dimension substantially the same as said inner dimension of said wall;
   a bottom affixed to one end of said wall;
   means for detachably lockingly securing said lid to said wall located at a point between said bottom and the top of said wall, said lid securing means defining an upper wall portion and a lower wall portion;
   wherein said lower wall portion, said bottom and said lid define a chamber in said receptacle and wherein said lid and said upper wall portion define an open receptacle portion; and
   means for detaching said lid from said wall secured to said lid.

2. The invention according to claim 1 wherein means for cooling the contents of said bowl is contained in said chamber.

3. The invention according to claim 1 wherein said open receptacle portion defines a chamber for receiving food therein.

4. The invention according to claim 1 wherein said securing means comprises:
   at least one lip portion adjacent the edge of said lid; and
   at least one detent means upon said wall for receiving said lip portion;

5. The invention according to claim 4 wherein said detent means comprises a groove extending around the interior of said wall.

6. The invention according to claim 5 wherein said groove has an approximately rectangular cross section.

7. The invention according to claim 1 wherein said means for detaching said lid from said wall comprises at least one tab member extending inwardly from the rim of said lid.

* * * * *